(12) United States Patent
Lee

(10) Patent No.: US 6,647,284 B1
(45) Date of Patent: Nov. 11, 2003

(54) PROBE COVER OF A TYMPANIC THERMOMETER AND TYMPANIC THERMOMETER ASSEMBLY

(75) Inventor: Herman Lee, Hsinchu (TW)

(73) Assignee: Oriental System Technology Inc., Hsinchu (TW)

( * ) Notice: Subject to any disclaimer, the term of this patent is extended or adjusted under 35 U.S.C. 154(b) by 0 days.

(21) Appl. No.: 10/428,371

(22) Filed: May 2, 2003

(30) Foreign Application Priority Data

Sep. 16, 2002 (TW) ........................................ 91121192 A

(51) Int. Cl.$^7$ ................................................ A61B 6/00
(52) U.S. Cl. ........................................ 600/474; 374/158
(58) Field of Search ................................ 600/474, 200, 600/437, 559, 301, 121; 374/158, 131, 130, 121

(56) References Cited

U.S. PATENT DOCUMENTS

| | | | | |
|---|---|---|---|---|
| 3,949,740 A | * | 4/1976 | Twentier | 600/200 |
| 4,662,360 A | * | 5/1987 | O'Hara et al. | 600/200 |
| 5,088,834 A | * | 2/1992 | Howe et al. | 374/158 |
| 5,163,418 A | * | 11/1992 | Fraden et al. | 600/200 |
| 5,588,748 A | * | 12/1996 | Nomura et al. | 374/158 |
| 5,673,692 A | * | 10/1997 | Schulze et al. | 600/301 |
| 5,833,367 A | * | 11/1998 | Cheslock et al. | 374/158 |
| 5,857,775 A | * | 1/1999 | Vodzak et al. | 374/131 |
| 5,871,279 A | * | 2/1999 | Mooradian et al. | 374/130 |
| 5,906,437 A | * | 5/1999 | Lin | 374/158 |
| 6,001,066 A | * | 12/1999 | Canfield et al. | 600/559 |
| 6,149,297 A | * | 11/2000 | Beerwerth et al. | 374/121 |
| 6,224,256 B1 | * | 5/2001 | Bala | 374/158 |
| 6,371,639 B1 | * | 4/2002 | Huang | 374/158 |
| 6,390,671 B1 | * | 5/2002 | Tseng | 374/158 |

* cited by examiner

*Primary Examiner*—George Manuel
*Assistant Examiner*—Ruby Jain
(74) *Attorney, Agent, or Firm*—Seyfarth Shaw LLP

(57) ABSTRACT

A probe cover of a tympanic thermometer and tympanic thermometer assembly includes a base and a sheath attached on the base. The base is a ring-shaped thin film object with a central opening permitting pass of the probe of a tympanic thermometer, and is engaged with flanges at the bottom of the probe. The sheath includes a circumferential wall that strains and circles around the sidewall of the probe, and an infrared window fitted on an opening at the front end of the probe. Since the thickness of the infrared window is thicker than that of the circumferential wall and the infrared window is free of pleats to keep a very uniform thickness, infrared can accurately penetrate through the infrared window to the probe of a tympanic thermometer for measuring a precise body temperature.

8 Claims, 3 Drawing Sheets

PROBE COVER OF A TYMPANIC THERMOMETER AND TYMPANIC THERMOMETER ASSEMBLY

BACKGROUND OF THE INVENTION

1. Field of the Invention

The present invention relates to a probe cover of a tympanic thermometer and a tympanic thermometer assembly, and more particularly, to a probe cover that prevents the probe of a tympanic thermometer from direct contact with external ear canal.

2. Background of the Invention

The tympanic membrane is generally considered by the medical community to be superior to oral, rectal, or underarm sites in representing the human body's core temperature. The temperature of the tympanic membrane can be measured by detecting the infrared radiation from the tympanic membrane in the ear canal. Additionally, since the time needed for measuring the body temperature by using an infrared thermometer is only about 1 to 2 seconds, the use of infrared thermometers has become more and more prevalent, and hospitals, clinics and families use tympanic thermometer to replace a mercury thermometer.

To measure the infrared radiation in the external ear canal, the probe of a tympanic thermometer must be inserted into the external ear canal for precisely sensing the infrared radiation emitted from the tympanic membrane for determining the temperature of the tympanic membrane. However, infection and contamination may be caused due to the direct contact of the probe with the ear canal when such a tympanic thermometer is used to determine the body temperature. That is, the probe will be contaminated by the blood of different patients' ear canals, and then the blood will be brought to contact another patient's ear canal during subsequent measurement, and infection occurs. In order to prevent this disadvantage, a probe cover that is discarded after use generally covers the tympanic thermometer and a new one is used for each patient.

FIG. 1 shows a probe cover 10 disclosed in U.S. Pat. No. 5,163,418. The probe cover 10 includes a sheath 11 and a ring-shaped base 12. The sheath 11 is formed by infrared transparent thin film having a thickness of about 0.001 inch, and its shape is similar to a cup with pleats on the circumferential wall 112. The sheath 11 includes a flat close end that serves as infrared window 111, and an open end for engaging the ring-shaped base 12. When the ring-shaped base 12 is fitted on and engaged with the probe of a tympanic thermometer, the infrared window 111 has to adhere flatly to an opening of the probe. However, pleats may appear on the infrared window 111 of probe cover 10, and stray radiation occurs to influence the precision of the temperature measurement. Additionally, the insertion of the circumferential wall 112 with pleats into the ear scrapes the skin of the ear canal and causes a noise that is similar to something entering the ear and makes patients feel uncomfortable.

FIG. 2 shows another probe cover 20 for tympanic thermometer disclosed in U.S. Pat. No. 5,088,834. The probe cover 20 includes a base 22 connected to a unitary frustum-shaped sheath 21 formed of infrared transparent material. The infrared window 211 at the closed end has the thinnest thickness of between 0.001 and 0.005 inch, while the wall 212 is thicker than the infrared window 212. The base 22 circumferentially engages the open end and is used to secure probe cover 20 on the probe. Although such probe cover 20 does not have a pleat and is more comfortable to patients, it has the drawback of poor uniformity on the infrared window 211. Since the sheath 21 extends by plastically deforming from its proximal open end to its distal closed end, the surface area also changes from a plane to a multiplied frustum-shaped, and the thickness changes from 0.03 to 0.0005 inch. Importantly, the infrared window 211 is not certified to have a uniform plastic conformation.

SUMMARY OF THE INVENTION

The present invention provides a probe cover of a tympanic thermometer that permits transmission of infrared and fits the shape of an ear canal. The probe cover comprises a base having a central opening and a sheath formed by thin film. The sheath comprises an infrared window with an approximately uniform thickness for sensing infrared radiation, an open end attached to the base and a circumferential wall extended from the open end to the infrared window. The thickness of the circumferential wall is smaller than that of the infrared window.

The primary objective of the present invention is to provide a probe cover of a tympanic thermometer and tympanic thermometer assembly. The infrared window of the probe cover is not influenced by plastic deformation, so that the uniformity of the thickness is improved to provide a precise measurement of the patient's temperature.

The second objective of the present invention is to provide a probe cover with low production cost. The probe cover is designed to engage the probe of a tympanic thermometer in a simple manner; it adapts to mass production and the production cost is therefore decreased.

The third objective of the present invention is to provide a probe cover with smooth circumferential wall to cover the probe of a tympanic thermometer. When such a probe cover is fitted on the probe of a tympanic thermometer, and then inserted into an ear canal, the probe of a tympanic thermometer strains the probe cover and the circumferential wall is free of pleats to avoid generation of noise.

To achieve the above-mentioned objectives, a probe cover of a tympanic thermometer is provided. The probe cover comprises a base and a sheath attached on the base. The base is a ring-shaped thin object with a central opening permitting the probe of a tympanic thermometer to pass and engage the flanges on the bottom of the probe. The sheath comprises a circumferential wall that strains and circles around the sidewall of the probe, and an infrared window is fitted on the opening at the front end of the probe. Since the thickness of the infrared window is thicker than that of the circumferential wall and the infrared window is free of pleats to keep a very uniform thickness, infrared radiation can penetrate through the infrared window to the probe of a tympanic thermometer for measuring the body temperature precisely.

BRIEF DESCRIPTION OF THE DRAWINGS

The present invention will be described according to the appended drawings in which.

PREFERRED EMBODIMENT OF THE PRESENT INVENTION

Figure 1:
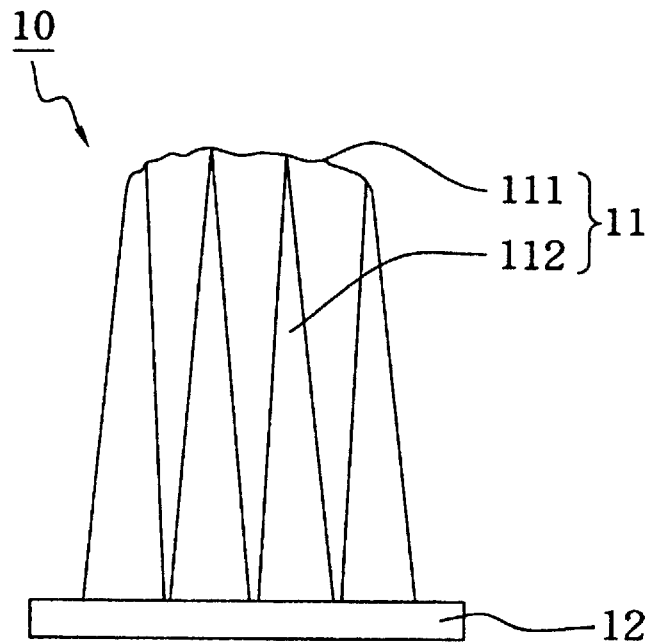
FIG. 1 is a schematic diagram showing a probe cover of a tympanic thermometer disclosed in U.S. Pat. No. 5,163,418.
Figure 2:
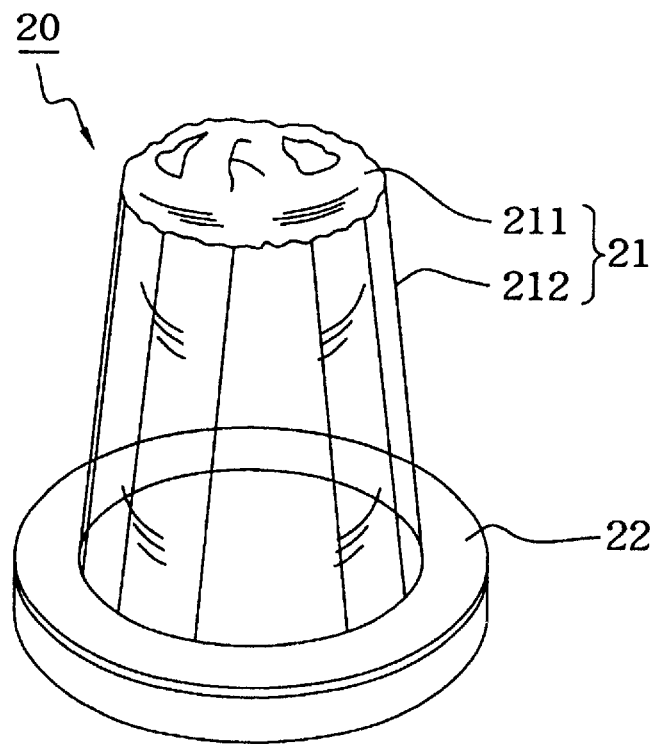
FIG. 2 is a 3-D diagram showing a probe cover of a tympanic thermometer disclosed in U.S. Pat. No. 5,088,834.
Figure 3:
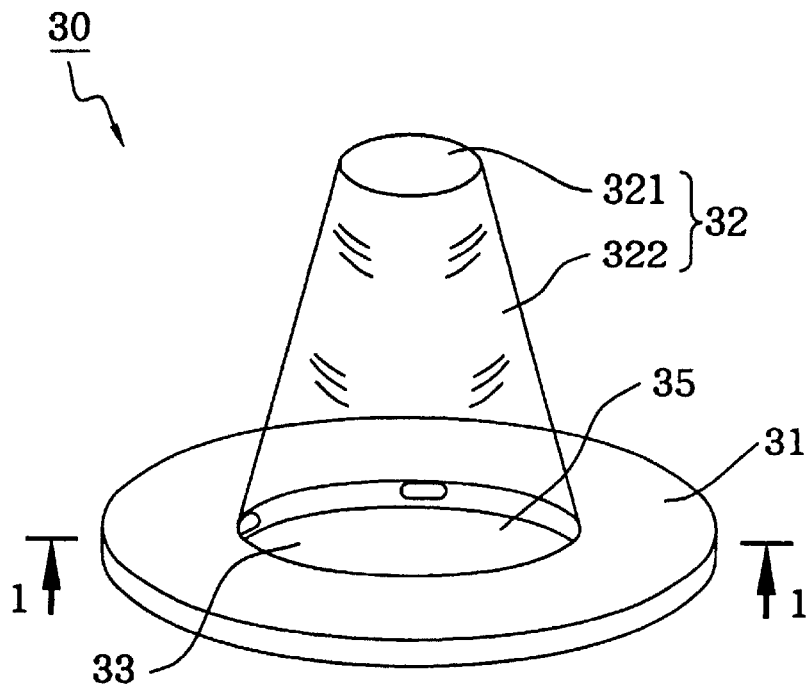
FIG. 3 is a 3-D diagram showing a probe cover of a tympanic thermometer according to the present invention.

FIG. 3 is a 3-D diagram showing a probe cover 30 according to the present invention. The probe cover 30 comprises a base 31 and a frustum-shaped sheath 32. The base 31 has a central opening 33, and the sheath 32 comprises an infrared window 321, an open end 35 attached to the base 31 and a circumferential wall 322 extended from the open end 35 to the infrared window 321. The sheath 32 is made of plastic thin film that is infrared transparent; preferably, the plastic thin film is low-density polyethylene (LDPE) or polypropylene (LDPP). Particularly, the sheath 32 has a better transmission for infrared radiation with wavelength between 3 μm and 15 μm. The base 31 may be made of the same material as the sheath 32, but with a higher density and moderate rigidity and elasticity. The base 31 and the sheath 32 may be fixed together using thermal coarctation or supersonic thermal fusion. Using a special mold, an extension process is performed to extend a thin film with an original thickness of about 0.001 inch to form the frustum-shaped sheath 32 that comprises an infrared window 321 on the top and a circumferential wall 322.

Figure 4:
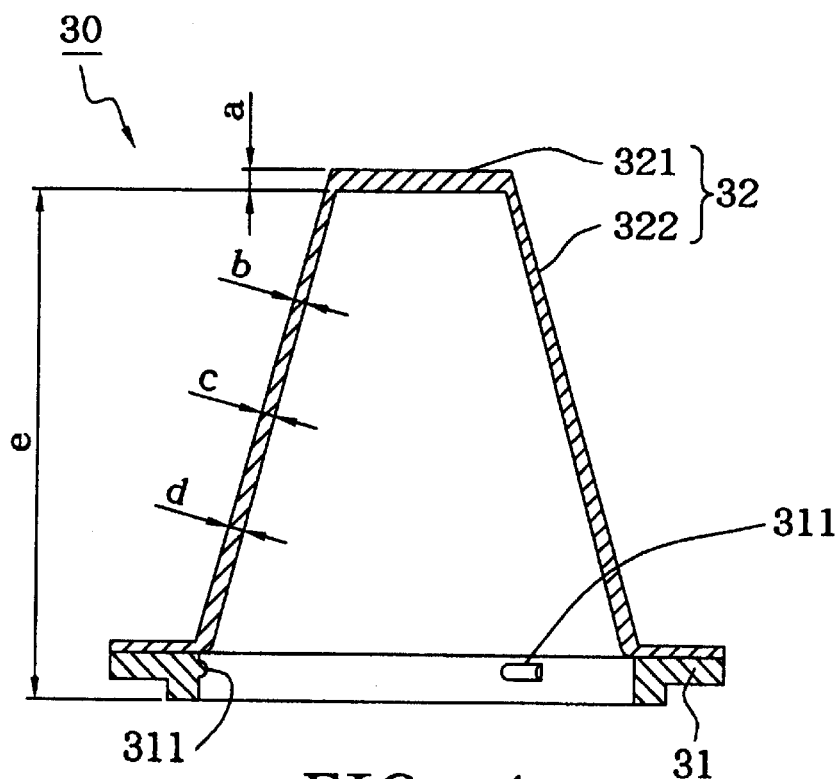
FIG. 4 is a cross-sectional diagram along line 1—1 of FIG. 3 showing a probe cover of a tympanic thermometer according to the present invention.

FIG. 4 is a cross-sectional diagram along line 1—1 of FIG. 3 showing a probe cover 30 for a tympanic thermometer according to the present invention. The thickness variation and structural design of the sheath 32 is clearly shown in FIG. 3. The thickness of the infrared window 321 is approximately the same as that before the extension process, that is, thickness (a) is about 0.001 inch. The circumferential wall 322 is outwardly extended from the base 31 to the infrared window 321 during the extension process. The thickness of the attaching area with the base 31 is therefore thicker, and the thickness of the circumferential wall 322 is tapered to become thinner from the attaching area with base 31 toward the infrared window 321, that is, b<c<d<0.001 inch. A plurality of flanges is located at the inner diameter of the base 32 to tightly engage the tympanic thermometer. Since the infrared window 321 maintains its original thickness during the extension process of the circumferential wall 322, the uniformity of the thickness is maintained at optimal and the occurrence of error due to thickness variation is prevented when sensing infrared radiation emission. According to the prior art, the structural arrangement of polymer is changed during the extension process of the circumferential wall, and the properties of thin film on reflecting and absorbing radiation have unpredictable variation. However, the infrared window 321 of the present invention completely avoids this disadvantage.

Figure 5:
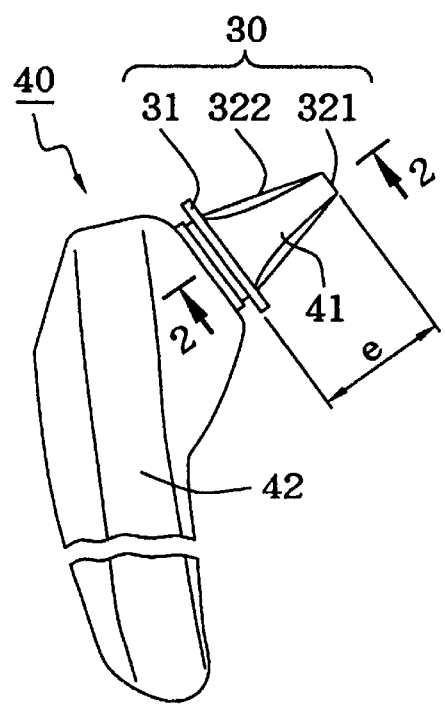
FIG. 5 is a shematic diagram showing a probe cover fitted on a tympanic thermometer.

FIG. 5 is schematic diagram showing the probe cover 30 fitted on a tympanic thermometer 40 according to the present invention. The depth of probe cover 30(e) may be slightly smaller than the height of a probe 41 of the tympanic thermometer 40. When the probe cover 30 is completely fitted on the probe 41, the sheath 32 will be strained moderately and the infrared window 321 is adhered to the top of probe 41. As a result, no pleat is generated on the infrared window 321 due to relaxation. Meanwhile, the circumferential wall 322 is smooth and comfortable for the external ear canal which prevents the generation of noise from scraping the skin of the ear canal of the pleats.

Additionally, a gap is formed between the probe 41 and the circumferential wall 322 to avoid the influence of the patient's temperature on the temperature of the probe 41. To measure a correct temperature of the tympanic membrane, an operator only needs to hold the handle 42 to fit the probe cover 30 on the probe 41, and then insert the probe 41 into the external ear canal of the patient and follow the subsequent instruction on the operation manual. The probe cover 30 is outwardly pushed from the probe 41 to discard after use, and a new one can be fitted on for another patient.

Figure 6:
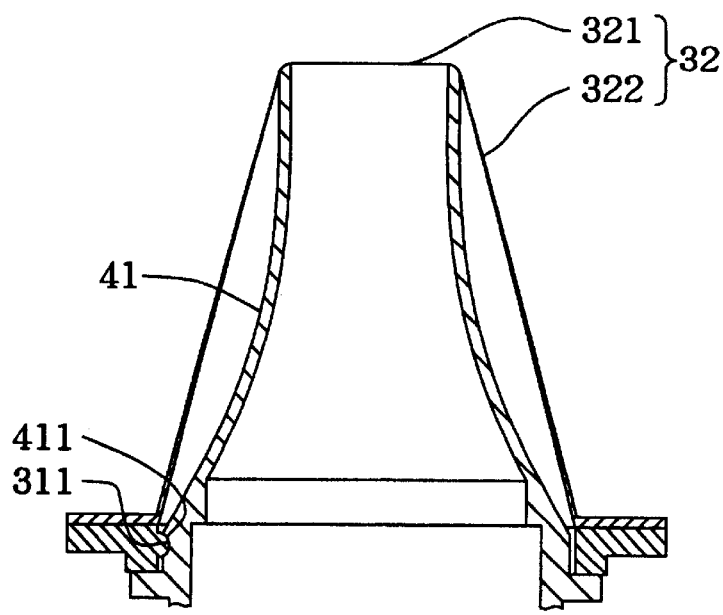
FIG. 6 is a cross-sectional diagram along line 2—2 of FIG. 5.

In order to provide a better engagement between the probe 41 and the probe cover 30, a plurality of flanges 311 may be located inside the central opening 33 of the base 31, preferably, located at the inner diameter of the base 31, and an engaging groove 411 is located at the bottom of the probe 41 relatively to engage the flanges 311, as showing in FIG. 6. Alternatively, flanges may be located at the outer diameter of the probe and the engaging groove is located at the inner diameter of the base.

While the invention has been described by way of example and in terms of a preferred embodiment, it is to be understood that the invention is not limited to the disclosed embodiment. To the contrary, it is intended to cover various modifications. Therefore, the scope of the appended claims should be accorded the broadest interpretation so as to encompass all such modifications.

What is claimed is:

1. A probe cover of a tympanic thermometer, comprising:
    (1) a base having a central opening; and
    (2) a sheath formed by a thin film, including:
        (a) an infrared window with uniform thickness for sensing infrared radiation;
        (b) an open end attached to the base; and
        (c) a circumferential wall extended from the open end to the infrared window, wherein the thickness of the circumferential wall is smaller than that of the infrared window.

2. The probe cover of a tympanic thermometer of claim 1, wherein an engaging mechanism is located inside the central opening of the base.

3. The probe cover of a tympanic thermometer of claim 2, wherein the engaging mechanism includes a plurality of flanges.

4. The probe cover of a tympanic thermometer of claim 1, wherein the thickness of the circumferential wall is tapered to become thinner from an attaching region with the base toward the infrared window.

5. The probe cover of a tympanic thermometer of claim 1, wherein the thickness of the infrared window is substantially equal to 0.001 inch.

6. A tympanic thermometer assembly, comprising:
    a tympanic thermometer including a probe for sensing infrared radiation and a handle; and
    a probe cover of claim 1, wherein the base is engaged with a bottom of the probe, and the infrared window contacts a top of the probe by fitting the open end on the probe.

7. The tympanic thermometer assembly of claim 6, wherein the circumferential wall strains naturally and is free of pleats.

8. The tympanic thermometer assembly of claim 6, wherein a gap is formed between the probe of a tympanic thermometer and the circumferential wall of the probe cover.

* * * * *